United States Patent [19]

Moriyoshi

[11] Patent Number: 4,612,728
[45] Date of Patent: Sep. 23, 1986

[54] DOUBLE-OPENING DEVICE OF AUTOMOBILE DOORS

[76] Inventor: Hattori Moriyoshi, 1658-2, Oaza Takamorimachi, Aso-gun, Kumamoto, Japan

[21] Appl. No.: 574,099

[22] PCT Filed: Aug. 2, 1982

[86] PCT No.: PCT/JP82/00301
§ 371 Date: Dec. 21, 1983
§ 102(e) Date: Dec. 21, 1983

[87] PCT Pub. No.: WO83/03871
PCT Pub. Date: Nov. 10, 1983

[30] Foreign Application Priority Data

May 1, 1982 [JP] Japan .................. 57-73812

[51] Int. Cl.[4] .......................... E05D 15/50
[52] U.S. Cl. .......................... 49/193; 49/382
[58] Field of Search .................. 49/193, 382

[56] References Cited

U.S. PATENT DOCUMENTS

| 331,466 | 12/1885 | Whitney | 49/193 X |
| 707,910 | 8/1902 | Fischer et al. | 49/193 X |
| 1,769,273 | 7/1930 | Penner | 49/193 X |
| 1,896,203 | 2/1933 | Rosatelli | 49/193 X |
| 2,195,991 | 4/1940 | Lovett | 49/193 X |

FOREIGN PATENT DOCUMENTS

| 3111595 | 10/1982 | Fed. Rep. of Germany | 49/382 |
| 318112 | 5/1931 | Japan. | |
| 52-20069 | 6/1977 | Japan. | |

Primary Examiner—Kenneth Downey
Attorney, Agent, or Firm—Wenderoth, Lind & Ponack

[57] ABSTRACT

A door mechanism for making a door openable from the opposite side edges and the opposite sides thereof including an automobile door having a frame plate having a locking projection extending into the door; a hinge attached to the frame plates for hinging the opposite side edges of the door to an automobile body; and a door latch in the door adjacent each side edge, each door latch having: a locking pawl adjacent the side edge of the door for locking or freeing the frame plate to the door; a linkage for moving the locking pawl; an operating plate mounted in the door and having the linkage connected thereto for engaging the locking pawl with the locking projection when the plate is rotated in one direction and for disengaging the locking pawl from the locking projection when the plate is rotated in the other direction; a first door handle having a first door handle link connected with the operating plate and a second door handle having a second door handle link connected with the operating plate; a spring connected with the operating plate for urging the operating plate to rotate in one direction; and a door lock for blocking the operating plate against rotation or freeing the operating plate for rotation.

3 Claims, 13 Drawing Figures

DOUBLE-OPENING DEVICE OF AUTOMOBILE DOORS

TECHNICAL FIELD

The present invention relates to a double-opening device of automobile doors, which can be operated from both inside and outside the doors and could serve for right-side opening by supporting at the left-side portion and for left-side opening by supporting at the right-side portion.

BACKGROUND ART

Conventionally, automobile doors are operated by a single-opening mechanism, where one end of the door facing the running direction is hinged to the door support protruding from the body frame, the other end of the door is provided with a locking device, with which the handles provided on the inner and outer sides of the door are operated together to open or close the door. This single-opening mechanism is often inconvenient, as the opening or closing operations are restricted when the automobile is parked in a limited space or near other obstacles.

The purpose of the present invention is to eliminate such restrictions to the opening and closing of automobile doors, and to make it much easier to get in and out of an automobile by providing doors with a double-opening mechanism, which would allow doors to be opened from both the left and right sides.

DISCLOSURE OF INVENTION

This invention refers to the double-opening mechanism for automobile doors, where frame plates are attached to the inner sides of the door frame on both sides by means of hinges, the right and left frame plates are fixedly joined on both sides of the door by the said hinges, providing locking pieces in the groove defined in the both sides of the door at the upper and lower positions of the left and right frame plates, the engaging pawl plates and pawl shafts furnished inside the door with the locking pieces of the frame plates, the center of the operating plate at its center portion on both sides of the door, connecting both ends of the operating plate being operated together with the pawl plates and the pawl shafts by means of connecting rods, the handle provided on the inside and outside of the door and operating plate with a lever-link mechanisms separately, engaging the pawl plate and the pawl shaft with respect to the locking pieces while rotating the operating plate, such state is maintained and the door is opened with its rotational mechanism at the hinge of frame plate on the other side, the holding mechanism of pawl plates and pawl shafts being released and connected with locking pieces of said frame plates when door is closed. The air-tightness on both sides of the door is thus increased and the hinges are strengthened. The double-opening operation can be performed easily by the handles provided on the inner and outer sides of the door.

BRIEF DESCRIPTION OF DRAWINGS

FIG. 11 is an enlarged front view illustrating the engagement between the upper pawl plate 11a of the door and an upper locking piece in the frame plate 3a;

BEST MODE FOR CARRYING OUT THE INVENTION

In order to explain the present invention in more detail, its construction is described in the following with reference to the attached drawings.

Figure 1:
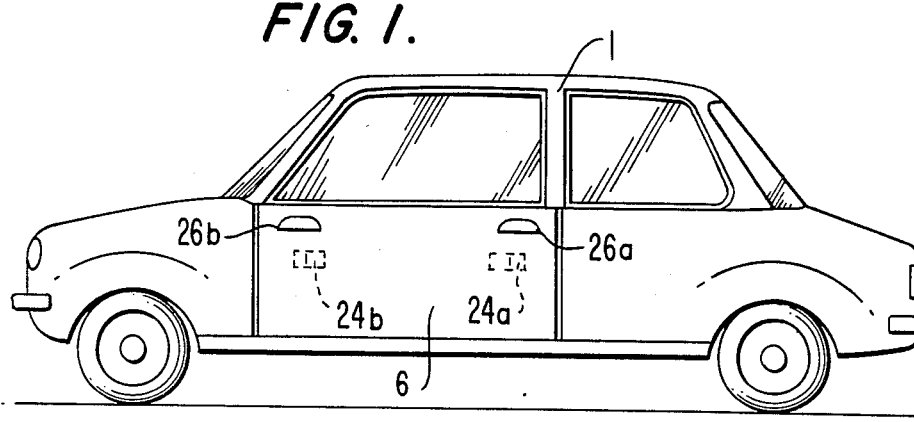
FIG. 1 is a side view of an automobile having installed a double-opening door mechanism according to the present invention.
Figure 2:
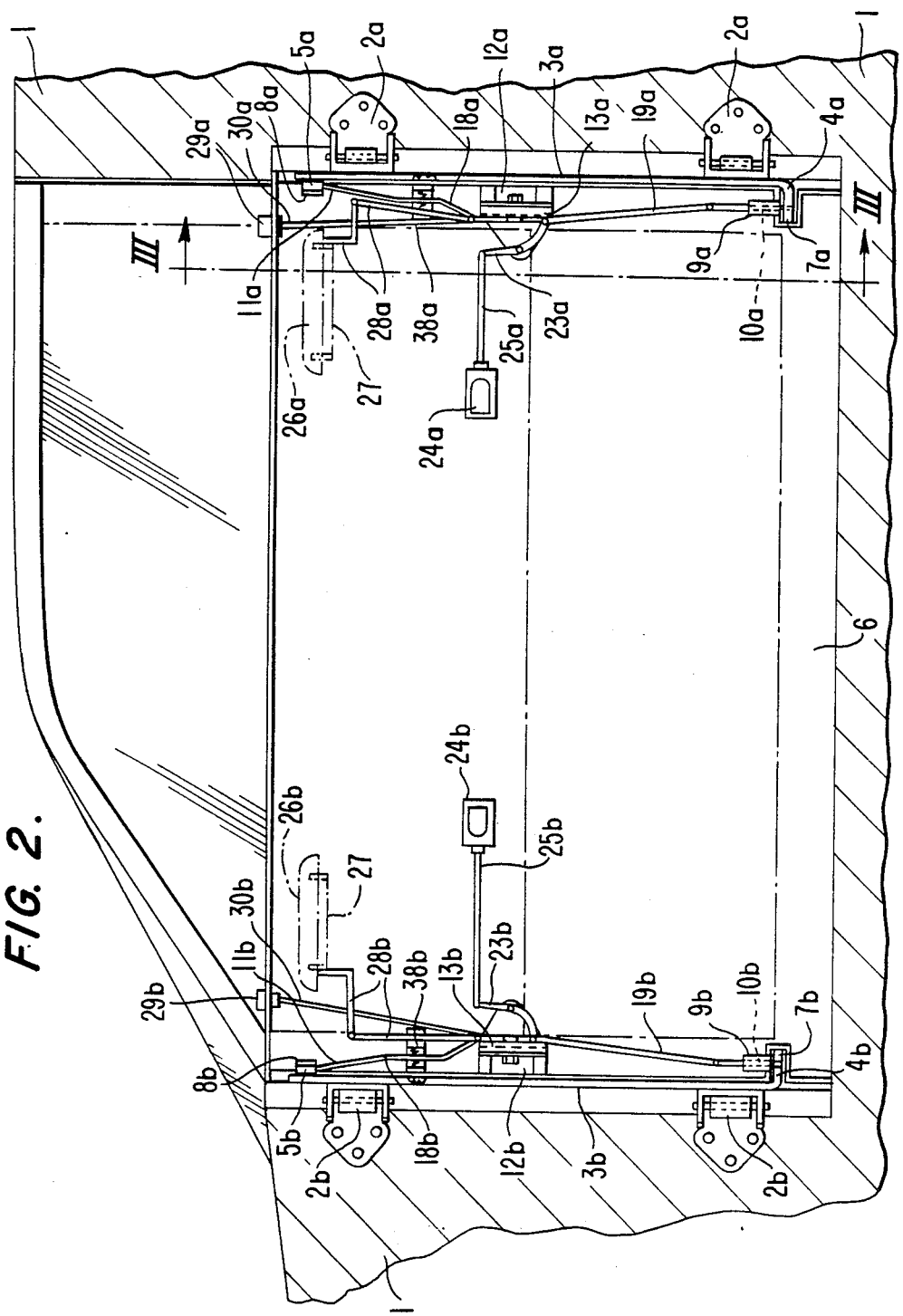
FIG. 2 is a front view of the double-opening mechanism on the inside of the door.
Figure 3:
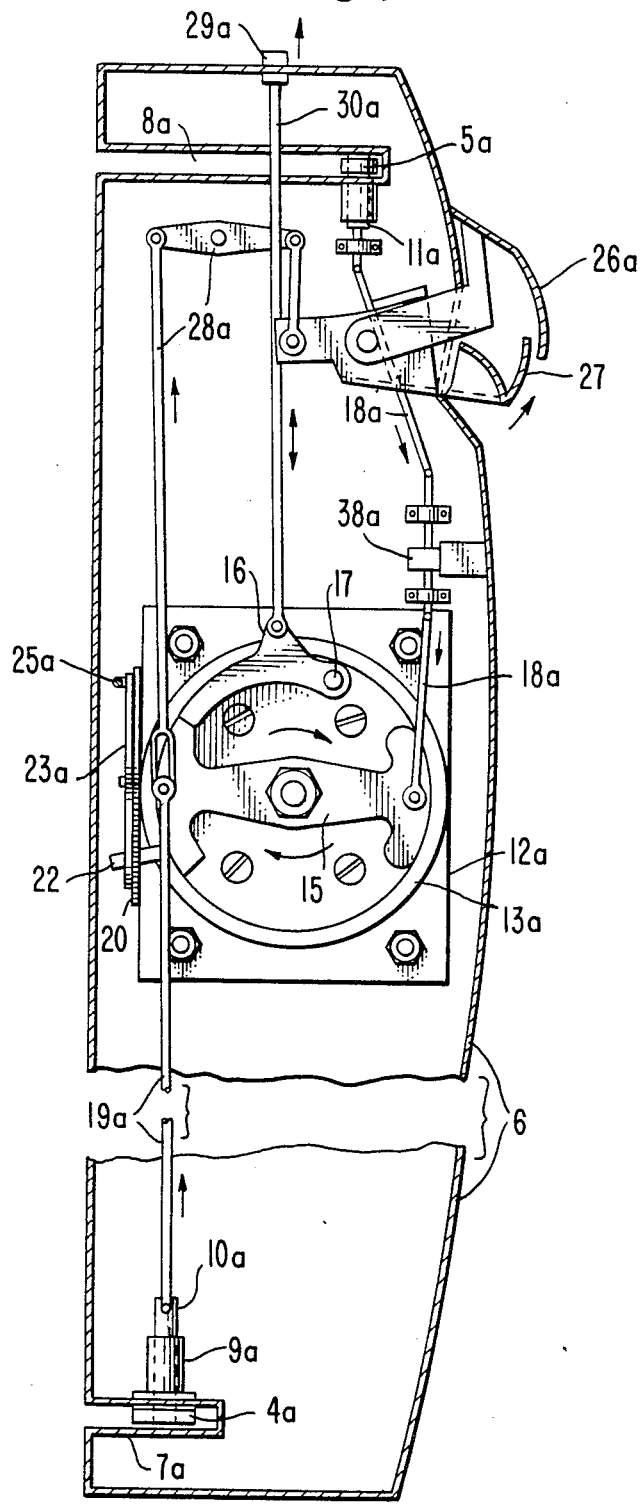
FIG. 3 is an enlarged sectional view along the line III—III in FIG. 2.
Figure 5:
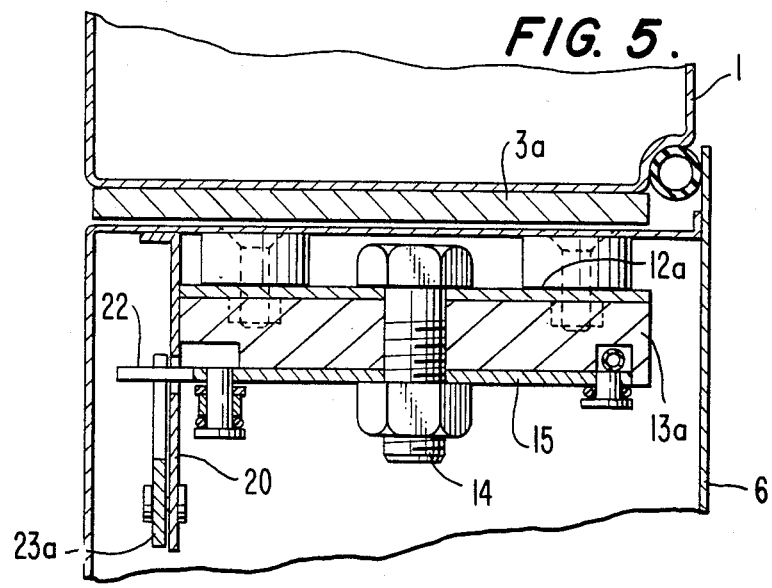
FIGS. 5, 6 and 7 are sectional views along the lines V—V, VI—VI, and VII—VII respectively in FIG. 4.
Figure 6:
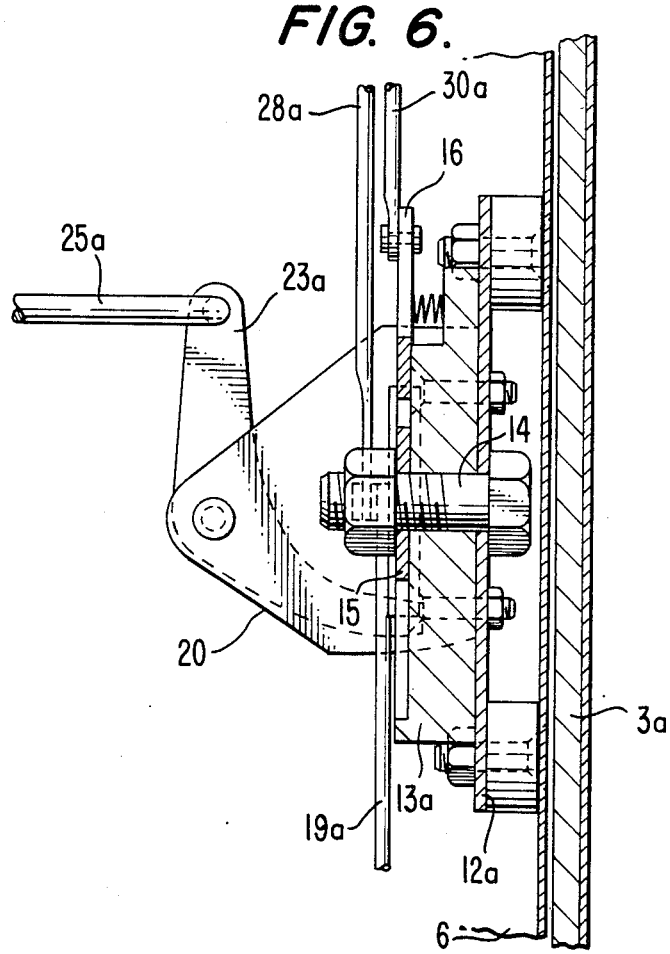
Figure 8:
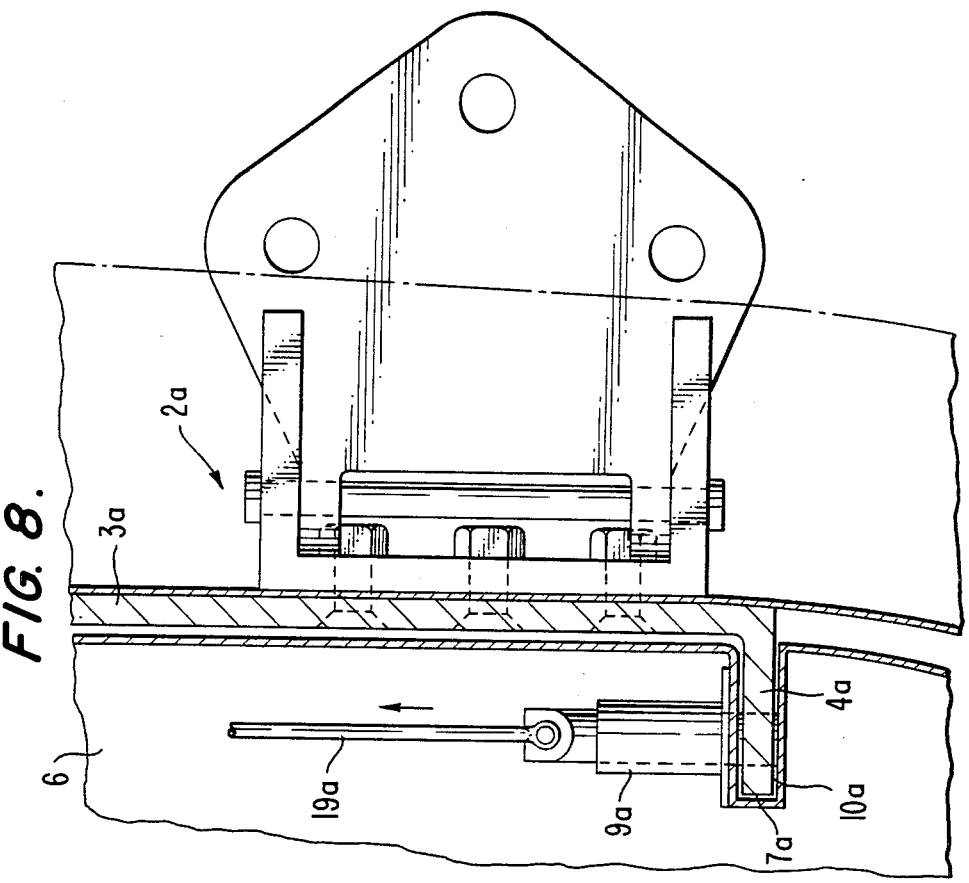
FIG. 8 is an enlarged front view illustrating the hinge at the lower right of the door.
Figure 7:
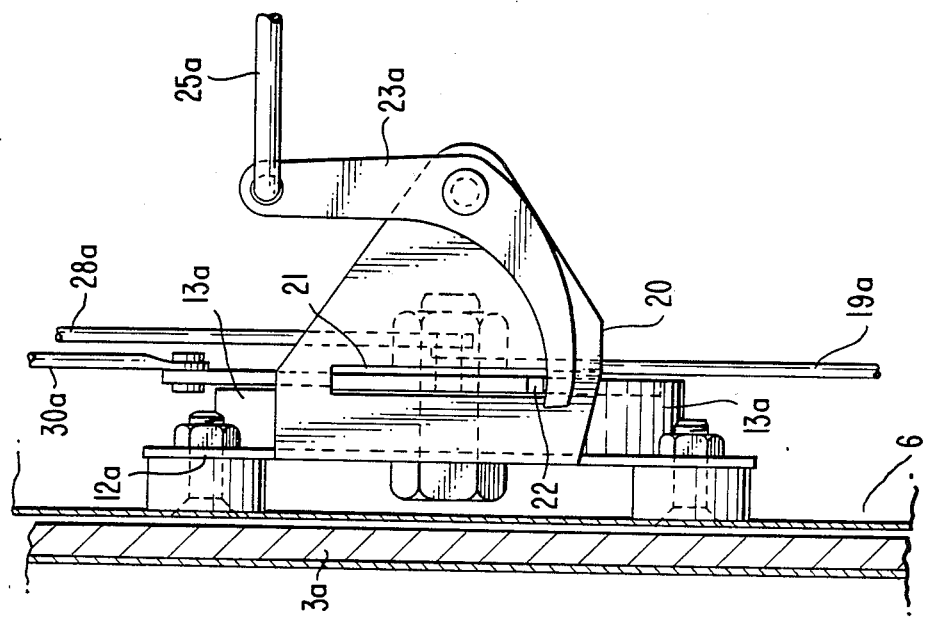
Figure 9:
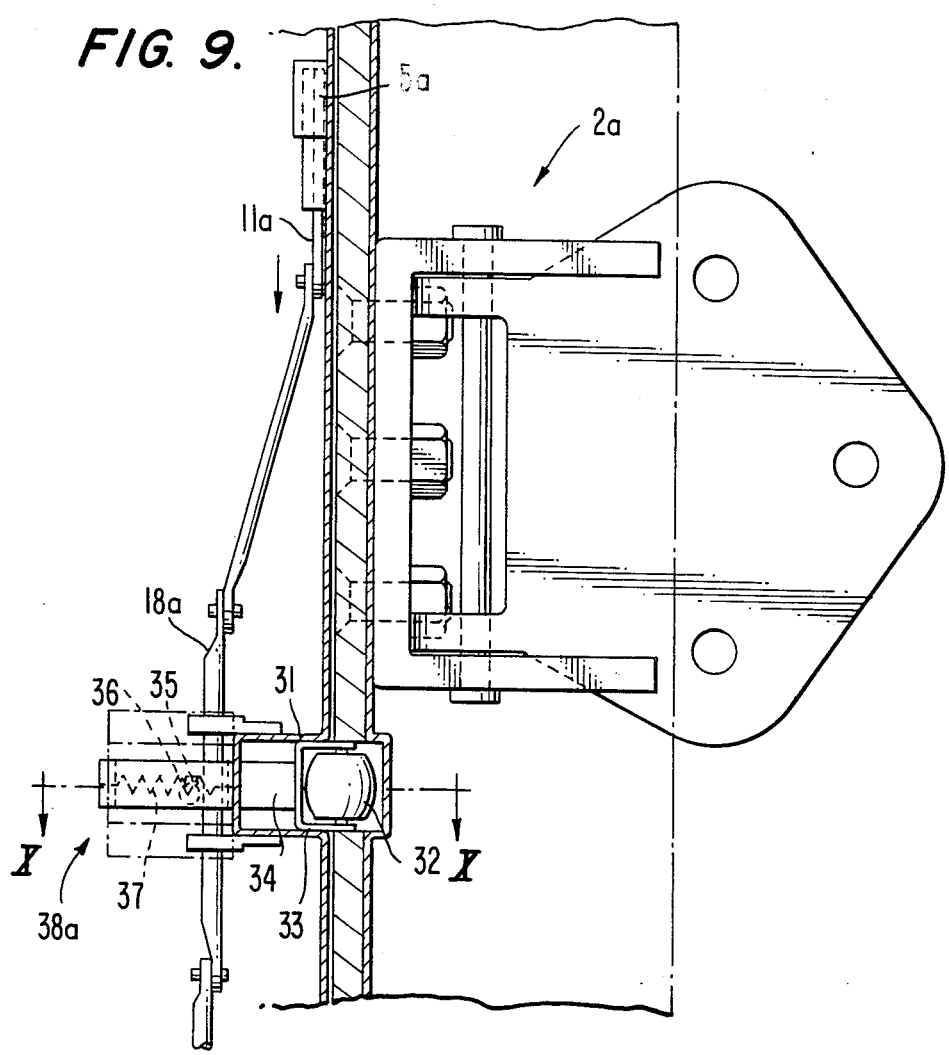
FIG. 9 is an enlarged front view showing the hinge at the upper right side of the door.
Figure 10:
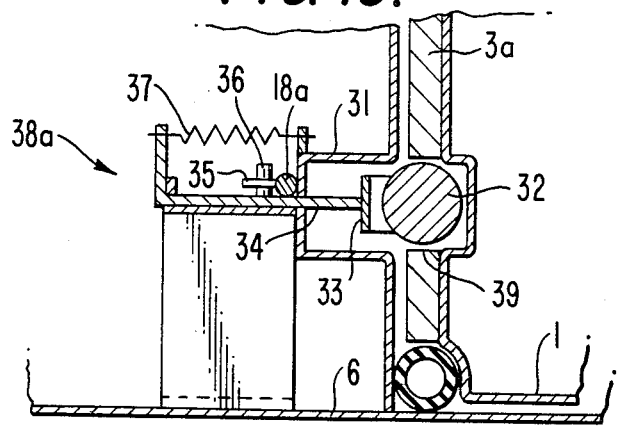
FIG. 10 is a sectional view along the line X—X of FIG. 9.
Figure 11:
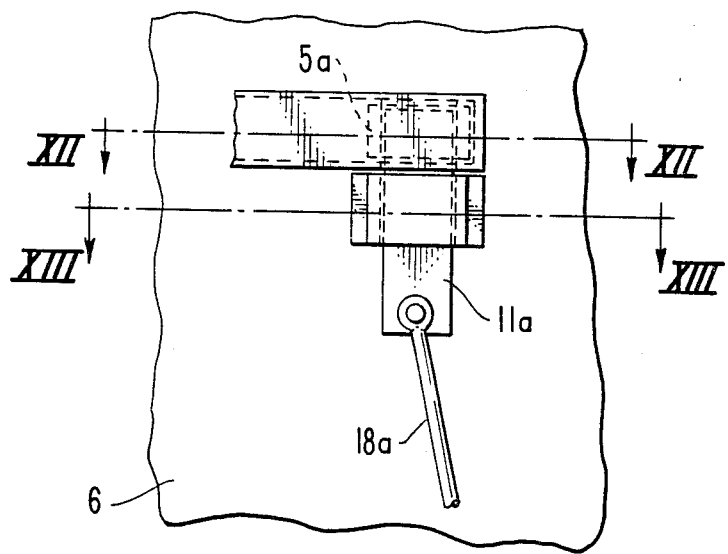
Figure 12:
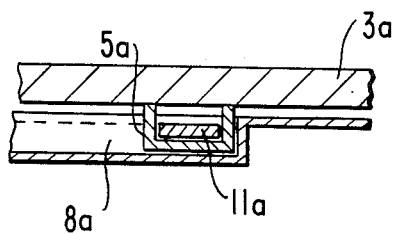
FIGS. 12 and 13 are sectional views along the lines XII—XII and XIII—XIII in FIG. 11 respectively.
Figure 13:
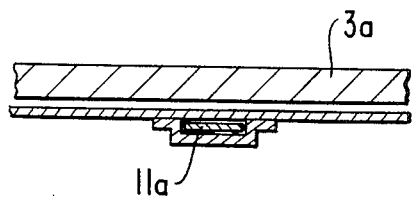

FIG. 1 shows the side view of an automobile. As shown in an internal mechanism of the door in FIG. 2, the right hinges 2a and 2a and the left hinges 2b and 2b are provided on the upper and lower parts of the internal portions of both sides of the door frame, and the right frame plate 3a and the left frame plate 3b are mounted on the hinges at both ends of the door. The lower parts of the left and right frame plates 3a and 3b are provided with the lower locking pieces 4a and 4b respectively which project into locking grooves 7a and 7b. At the same time, the upper locking pieces 5a and 5b are provided close to the upper end. At both ends of the door 6, which is received in the door frame 1 are the right and left frame plates 3a and 3b, the lower grooves 7a and 7b into which the lower locking pieces 4a and 4b fit and the upper grooves 8a and 8b into which the upper locking pieces 5a and 5b are embedded in the inner side of the door. Guide tubes 9a and 9b are fixed on the upper surfaces of the lower grooves 7a and 7b in order to receive lower pawl shafts 10a and 10b, which fit into the locking holes in the lower locking pieces 4a and 4b. Guide tubes of the same type are provided on the lower surfaces of the upper grooves 8a and 8b in order to receive upper pawl plates 11a and 11b, which fit into locking holes of the upper locking pieces 5a and 5b. Base plates 12a and 12b are provided at the center of the inner space at both sides of the door 6, and left and right circular guide disks 13a and 13b are provided thereon. A pin 14 is installed at the internal center of circular guide disks 13a and 13b in order to support the center of the operating plate 15. FIGS. 3-7 show the opening and closing mechanism of the right portion of the door. One end of a spring 15a, which is set into a peripheral groove 15b in the circular guide disk 13, is connected to one end of the operating plate 15, so that the latter can be returned after it has been rotated. A stopper 16 which locks the operating plate 15 on the front upper positions of right and left guide disks 13a and 13b is freely rotatably mounted on a pin 17. Further, pins 15c and 15b are mounted at both ends of operating plates 15 of left and right circular guide disks 13a and 13b. The lower ends of the upper connecting rods 18a and 18b are freely rotatably connected to the pin 15c toward the one side of the door 6. At the same time, the upper ends of the lower connecting rods 19a and 19b are freely connected to the pin 15d of the operating plate at the other side of the door 6. The upper ends of the upper connecting rods 18a and 18b are coupled with the upper pawl plates 11a and 11b, and the lower ends of the lower connecting rods 19a and 19b are coupled with the lower pawl shafts 10a and 10b. From one side of the base plates 12a and 12b facing the side portions of the door 6, the arm plate 20 extends, and this arm plate is provided with a slot 21, into which an ear piece 22 located at one end of the operating plate 15 is inserted. The centers of L-shaped levers 23a and 23b are fixed on the outer tips of the arm plates 20 of the left and right opening-closing mechanism, and the levers are engaged respective ear pieces 22 of the operating plates. The internal handles 24a and 24b installed on both sides of the inside the door 6 are connected with the upper ends of L-shaped levers 23a and 23b by means of connecting rods 25a and 25b. The operating lever 27 on the external handles 26a and 26b located on both sides of the outside of the door 6 is coupled with a free locking pin on the lower connecting rods 19a and 19b of the left and right operating plates 15 by means of the lever-link mechanisms 28a and 28b. Locking buttons 29a and 29b are provided on the inner sides of the window frames of the door 6 close to their left and right sides, and the lower ends of the connecting rods 30a and 30b coupled with the stoppers 16 of the operating plates 15 are connected with the locking buttons 29a and 29b. The right locking button 29a is pulled upward to release the stopper 16 from the operating plate 15, and by operating lever 27 of the internal handle 24a or the external handle 26a on the inside and outside of the right side of the door, the operating plate 15 is rotated in the direction of the arrow as shown in FIG. 3. Then, the upper connecting rod 18a is pulled down and the lower connecting rod 19a is pulled up. As shown in FIGS. 8 and 9, the upper pawl plate 11a is released from the upper locking piece 5a of frame plate 3a, and the lower pawl shaft 10a is released from the lower locking piece 4a. The right end of door 6 is separated from frame plate 3a and can be opened outward around the hinges 2b and 2b on the left side. In order to hole upper and lower pawl plates and pawl shafts when the door is opened, a concave portion 31 is provided on both sides of the door 6, facing the upper connecting rods 18a and 18b, as shown in FIGS. 9 and 10, bracket 33 holding a roller 32 supported by a shaft is fitted into the concave 31, a holding plate 34 on the back of bracket 33 protrudes toward the connecting rod from the back of bracket 33 at the back of concave portion and faces the connecting rod, on the opposite side of the concave portion 31, a wedge-shaped stopper 35 is provided on connecting rods 18a and 18b, and the holding plate 34 has a locking pin 36 projecting therefrom, which locks against the upper surface of the stopper 35. Between the rear end of the holding plate 34 and the concave 31 is a spring 37. Such a pawl shaft holding mechanism is installed on both sides of the door 6. A hole 39 is provided in left and right side frame plates 3a and 3b in order to receive the roller 32 of the pawl shaft holding mechanisms 38a and 38b.

Further, the functions and the effects of the present invention will be described with reference to the attached drawings.

Figure 4:
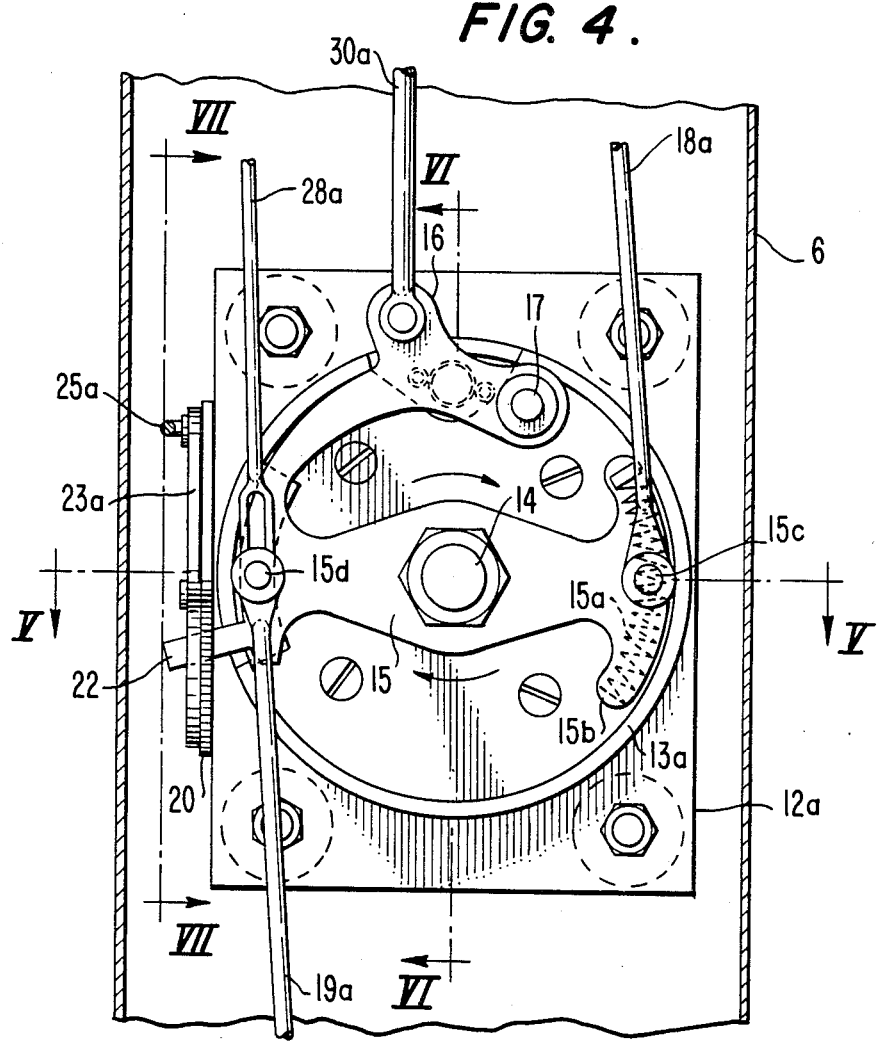
FIG. 4 is an enlarged front view showing the operating plate mechanism.

When the locking buttons 29a or 29b and automobile door 6 are pushed downward, the stopper 16 engages the operating plate 15 on both sides of the door, thus stopping the rotation of the operating plate 15. The door 6 is locked with the upper pawl plates 11a and 11b and the lower pawl shafts 10a and 10b fitted to the upper locking pieces 5a and 5b and the lower locking pieces 4a and 4b on the left and right side frame plates 3a and 3b on both sides of the door. On the left door 6 of the automobile as shown in FIG. 2, the locking button 29a on the right side is pushed upward, and the stopper 16 of the right operating plate 15 is pulled up and rotated upward around the pin 17 in order to release the operating plate 15 from locking. When the internal handle 24a is operated from inside the automobile and the upper end of the L-shaped lever 23a is pulled by the connecting rod 25a, next, the lower end of the L-shaped lever 23a is pushed upward and rotated, pushing the ear piece 22 of the operating plate 15 upward. When the operating plate 15 is rotated in the direction of the arrow as shown in FIGS. 3 and 4 against the elastic force of the spring 15a on the circular guide disk 13a, the upper connecting rod 18a is pulled down, and the lower connecting rod 19a is pulled up. The upper pawl plate 11a slides down and the lower pawl shaft 10a slides up, and both are released from the upper and lower locking pieces 5a and 4a. As the upper connecting rod 18a is pulled down, the wedge-shaped stopper 35 is guided underneath the locking pin 36. When the right side of the door 6 is pushed from inside, the right end of door 6 is separated from the right side frame plate 3a and is opened externally on the upper and lower hinges 2b and 2b on the left side.

When the door 6 is opened, the upper surface of the wedge-shaped stopper 35 of the upper connecting rod 18a is engaged with the locking pin 36, thus blocking the return of the operating plate 15 and the elastic force of the spring and maintaining the upper pawl plate 11a and lower pawl shaft 10a in their withdrawn positions. When the door 6 is opened by using the external handle 26a, the operating lever 27 in the external handle 26a is pushed upward by the finger as shown in FIG. 3. Next, the operating plate 15 is rotated by the lever-link mechanism 28a, which is coupled with the operating lever 27, and the lower pawl shaft 10a and upper pawl plate 11a are moved by the upper and lower connecting rods 18a and 19a, thus releasing the upper and lower locking pieces 5a and 4a and opening the door. When the opened door 6 is closed, the upper groove 8a and lower groove 7a on the upper and lower portions of right side of door 6 are fitted to the upper locking piece 5a and the lower locking piece 4a of the right side frame plate 3a. The roller 32 of the pawl shaft holding mechanism 38a is pushed by the right side frame plate 3a, and the locking pin 36 is caused to slide, releasing the wedge-shaped stopper 35. The operating plate 15, on which elastic force of spring 15a of the circular guide disk 13a acts, is rotated in a reverse direction and is returned to its initial position, and at the same time, the upper connecting rod 18a slides upward and the lower connecting rod 19a slides downward. The upper pawl plate 11a and the lower pawl shaft 10a are fitted to the upper and lower locking pieces 5a and 4a, thus maintaining the closed state of door 6.

Further, the internal handle 24b and the external handle 26b on left side of door 6 operate on the same principle. The operating plate 15 set on the circular guide disk 13b on left side is rotated, and the upper pawl plate 11b and the lower pawl shaft 10b are released from the upper and lower locking pieces 5b and 4b. Thus, the door 6 can be opened around the upper and lower hinges 2a, 2a on right side frame plate 3a.

In this way, the present invention makes it possible to open the automobile's door to the left and right from both inside and outside the automobile, and to facilitate the opening and closing of the automobile's door in limited spaces or near other obstacles. Both ends of door 6 are fitted to the left and right side frame plates 3a and 3b, which are fixed on both sides of the inside door frame by means of upper and lower hinges. As the pawl mechanism of the door is freely attached to and released from the locking pieces of frame plates, the hinged portions are strengthened, and the air-tightness on both sides of the door is also increased.

Industrial Applicability

As is self-evident from the above explanation, the double-opening device of the present invention is applicable not only to the doors of automobile of various types but also to the doors in residential housing and so on.

I claim:

1. A door mechanism for making a door openable from the opposite side edges and the opposite sides thereof, comprising:
   an automobile door having a frame plate at each side edge thereof having locking projection means thereon extending into said door;
   hinge means attached to said frame plates for hinging the opposite sides edges of said door to an automobile body; and
   door latching and unlatching means in said door adjacent each side edge, each door latching and unlatching means having:
   a locking pawl means adjacent the side edge of said door and engageable with and disengageable from said locking projection means on the frame plate for locking said frame plate to the door or freeing said frame plate from said door;
   linkage means connected to said locking pawl means for moving said locking pawl means;
   an operating plate rotatably mounted in said door adjacent the side edge of the door and having said linkage means connected thereto for being moved for engaging said locking pawl means with said locking projection means when said plate is rotated in one direction and for being moved for disengaging said locking pawl means from said locking projection means when said plate is rotated in the other direction;
   a first door handle means on one face of said door and having a first door handle link means connected with said operating plate and a second door handle means on the other face of said door and having a second door handle link means connected with said operating plate, said door handle link means being connected with said operating plate for rotating said operating plate in said other direction when either of said door handle means is actuated;
   spring means connected with said operating plate for urging said operating plate to rotate in said one direction; and
   door lock means engageable with and disengageable from said operating plate for blocking said operating plate against rotation or freeing said operating plate for rotation.

2. An automobile door mechanism as claimed in claim 1 in which said projection means comprise projections at the top and bottom of said door, and said locking pawl means comprise locking pawls at the top and bottom of said door for engaging the respective projections, and said linkage means is connected to both said top and bottom locking pawls and to said operating plate.

3. An automobile door mechanism as claimed in claim 1 further comprising linkage holding means operable upon movement of said door away from the automobile body for holding said linkage means against movement for moving said locking pawl means into engagement with said locking projecting means and operable upon engagement of said door with the automobile body for releasing said linkage means.

* * * * *